US012046778B2

(12) United States Patent
Christie et al.

(10) Patent No.: US 12,046,778 B2
(45) Date of Patent: Jul. 23, 2024

(54) COOLING PLATES FOR FUEL CELLS

(71) Applicant: Intelligent Energy Limited, Loughborough (GB)

(72) Inventors: Carl Christie, Loughborough (GB); Christopher J. Gurney, Loughborough (GB); Harry J. Karmazyn, Loughborough (GB); Lydia Jowsey, Loughborough (GB)

(73) Assignee: INTELLIGENT ENERGY LTD., Loughborough (GB)

( * ) Notice: Subject to any disclaimer, the term of this patent is extended or adjusted under 35 U.S.C. 154(b) by 0 days.

(21) Appl. No.: 17/048,333

(22) PCT Filed: Apr. 16, 2019

(86) PCT No.: PCT/GB2019/051074
§ 371 (c)(1),
(2) Date: Oct. 16, 2020

(87) PCT Pub. No.: WO2019/202304
PCT Pub. Date: Oct. 24, 2019

(65) Prior Publication Data
US 2021/0218038 A1    Jul. 15, 2021

(30) Foreign Application Priority Data

Apr. 18, 2018 (GB) ..................... 1806346

(51) Int. Cl.
*H01M 8/0258* (2016.01)
*H01M 8/0254* (2016.01)
*H01M 8/026* (2016.01)
*H01M 8/0263* (2016.01)
*H01M 8/0267* (2016.01)
*H01M 8/04014* (2016.01)

(52) U.S. Cl.
CPC ....... *H01M 8/0258* (2013.01); *H01M 8/0254* (2013.01); *H01M 8/026* (2013.01); *H01M 8/0263* (2013.01); *H01M 8/0267* (2013.01); *H01M 8/04014* (2013.01)

(58) Field of Classification Search
CPC ............. H01M 8/0258; H01M 8/0267; H01M 8/04014; H01M 8/0254
See application file for complete search history.

(56) References Cited

U.S. PATENT DOCUMENTS

| 2001/0041281 | A1 | 11/2001 | Wilkinson et al. |
| 2003/0031904 | A1* | 2/2003 | Haltiner, Jr. ......... F28D 9/0093 |
| | | | 429/440 |
| 2005/0064263 | A1 | 3/2005 | Goebel et al. |
| 2005/0170234 | A1 | 8/2005 | Liu et al. |
| 2007/0117004 | A1 | 5/2007 | Kikuchi et al. |
| 2007/0154758 | A1 | 7/2007 | Kikuchi et al. |
| 2010/0310958 | A1* | 12/2010 | Naito ................ H01M 8/04029 |
| | | | 429/434 |
| 2011/0300465 | A1* | 12/2011 | Ohta .................... H01M 8/241 |
| | | | 429/457 |
| 2015/0064590 | A1* | 3/2015 | Numao ............... H01M 8/2483 |
| | | | 429/432 |
| 2016/0211533 | A1* | 7/2016 | Ishida ..................... H01M 8/10 |
| 2017/0110740 | A1 | 4/2017 | Gurney et al. |
| 2017/0117559 | A1* | 4/2017 | Yamano ............. H01M 8/1018 |
| 2018/0226662 | A1* | 8/2018 | Yang .................. H01M 8/0276 |

FOREIGN PATENT DOCUMENTS

| CN | 2672882 Y | * | 1/2005 | ............. H01M 8/02 |
| CN | 105556721 A | | 5/2016 | |
| CN | 106165172 A | | 11/2016 | |
| CN | 209607840 U | | 11/2019 | |
| GB | 2565370 A | * | 2/2019 | .......... H01M 8/0204 |
| JP | H08-153525 A | | 6/1996 | |
| JP | 2007-507072 A | | 3/2007 | |
| JP | 2017-510954 A | | 4/2017 | |
| KR | 2016-0138069 A | | 12/2016 | |
| WO | WO-2009154082 A1 | * | 12/2009 | .......... H01M 8/0258 |
| WO | WO-2013092630 A1 | * | 6/2013 | .......... H01M 8/0263 |
| WO | WO 2015/041222 A1 | | 3/2015 | |

OTHER PUBLICATIONS

What is a Sinusoidal Wave Signal, available online at https://www.tutorialspoint.com/what-is-a-sinusoidal-wave-signal-definition-and-importance#:~:text=A%20sinusoidal%20wave%20signal%20is,signal%20or%20cosine%20functioned%20signal. date unknown.*
International Patent Application No. PCT/GB2019/051074; Int'l Preliminary Report on Patentability; dated Oct. 29, 2020; 8 pages.
Great Britain Patent Application No. 1806346.1; Combined Search and Examination Report; dated Oct. 16, 2018; 7 pages.
International Patent Application No. PCT/GB2019/051074; Int'l Search Report and the Written Opinion; dated Jul. 3, 2019; 14 pages.

* cited by examiner

*Primary Examiner* — Anca Eoff
(74) *Attorney, Agent, or Firm* — BAKER HOSTETLER LLP (57) ABSTRACT

Separator plates (108; 300; 400; 410) for fuel cell assemblies have a first edge (110, 310) and a second, opposing edge (111, 311). The fuel cell separator plates define a series of airflow channels (112, 113, 312, 313, 401, 411) extending longitudinally between the first and second edges. The airflow channels can be non-linear airflow channels formed from a linked series of bumps (320) opposite to corresponding recesses (321) in the facing channel walls. The linked series of bumps and recesses can run the entire channel length. The linked series of bumps and recesses can be formed as a sinusoidal wave having an amplitude and a frequency.

1 Claim, 8 Drawing Sheets

COOLING PLATES FOR FUEL CELLS

FIELD OF THE DISCLOSURE

This application is a 371 National Stage application of International Patent Application No. PCT/GB2019/051074 filed on Apr. 16, 2019, which claims priority from GB Patent Application No. 1806346.1 filed on Apr. 18, 2018, the entire contents of which are incorporated by reference herein.

This disclosure is in the field of separator plates for fuel cells. In particular, the disclosure relates to devices and methods for use in providing cooling and/or oxidant airflow to active areas of fuel cells.

BACKGROUND

In open cathode fuel cell stacks, airflow is directed across the cathode side of each fuel cell to provide oxidant to the cathode side of the membrane-electrode assembly ("MEA") of each fuel cell. Oxidant is typically provided via a diffusion layer. In order to achieve uniform airflow to the fuel cells across an entire fuel cell stack having a plurality of fuel cells, airflow can be provided in parallel across the fuel cell stack between opposing faces of the stack. Airflow can thus be provided across each cell from one edge of the cell to an opposing edge of the cell.

One method of achieving sufficient airflow rates across the fuel cells of a fuel cell stack is providing airflow through corrugated cathode separator plates. Such separator plates act to form an electrical connection with the cathode side of the fuel cell electrolyte and act to provide pathways for airflow across an underlying diffusion layer. The separator plates can define a set of flow channels across the width of each plate, with each flow channel extending along the length of each plate. Some fuel cell stacks can utilize corrugated separator plates for cooling airflow only and provide cathode/oxidant airflow separately.

For optimum performance of a fuel cell stack, it is desirable to maintain adequate cooling across the entire surface of each fuel cell, both laterally across the width of each plate and longitudinally along the length of each flow channel of each plate. The use of additional motive force to increase airflow rates can create parasitic power losses for the overall stack performance, as increased electrical power to drive a fan, for example, can use more power than is gained via improved fuel cell outputs.

Further, for optimum performance, compression of the MEA across each fuel cell must be sufficiently high to avoid higher contact resistance and lower efficiency due to ohmic losses. It is also desirable to provide even compression of each MEA across the surface of each fuel cell in order to avoid the formation of shear stress exerted on the MEA, which can lead to cell failure due to pin-holing of the MEA. Uniformity of compression throughout a fuel cell stack is important to stack electrical performance, which is limited by electrical variations throughout the stack, which can have tens or hundreds of fuel cells contained in a stack under several tons of compressive force between a pair of end plates. It is important to avoid any variations from being introduced during the manufacturing and assembly processes or from uneven component thicknesses, either laterally across the width of each plate or longitudinally along the length of each flow channel of each plate, as these variations can lead to problems with uniformity throughout a fuel cell stack having tens or hundreds of repeated component layers.

Thus, there is a need for improved plates for fuel cell cooling. The disclosure is directed to these and other important needs.

DISCLOSURE

The present disclosure provides aspects of separator plates comprising a first edge and a second, opposing, edge. The separator plates can define a series of airflow channels extending longitudinally between the first and second opposing edges of the separator plate. The separator plates can comprise non-linear airflow channels formed from a linked series of bumps opposite to corresponding recesses in the facing channel wall. The separator plates can define the series of airflow channels with a plurality of corrugations, each corrugation in the separator plate comprising a crest and a trough defining the air flow channels, with the separation between a pair of adjacent crests or between a pair of adjacent troughs corresponding to a channel width w, and with the distance between the first and second opposing edges corresponding to a channel length l. The linked series of bumps and recesses can run the entire channel length l. The linked series of bumps and recesses can be formed as a sinusoidal wave having an amplitude and a frequency.

The present disclosure provides aspects of air-cooled fuel cell assemblies comprising an anode plate, an anode side diffuser layer, an anode gasket, a membrane electrode assembly (MEA), a cathode gasket, a cathode side diffuser layer, a separator plate as described in the disclosure, and a pair of gaskets.

The present disclosure provides aspects of air-cooled fuel cell stack assemblies comprising a first end plate, a plurality of air-cooled fuel cell assemblies as described in the disclosure, and a second end plate. The plurality of air-cooled fuel cell assemblies can be aligned with the first edges together forming an inlet face of the fuel cell stack assembly and the second edges together forming an outlet face of the fuel cell stack assembly.

The present disclosure provides aspects of methods of operating air-cooled fuel cell stack assemblies as described in the disclosure. The methods can comprise providing air flow into the inlet face of the fuel cell stack assembly.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In the figures, like reference numerals designate corresponding parts throughout the different views. All callouts and annotations are hereby incorporated by this reference as if fully set forth herein. In addition, the drawings are not necessarily drawn to scale. In the drawings.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about," it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any subcombination. Further, reference to values stated in ranges include each and every value within that range.

Figure 1:
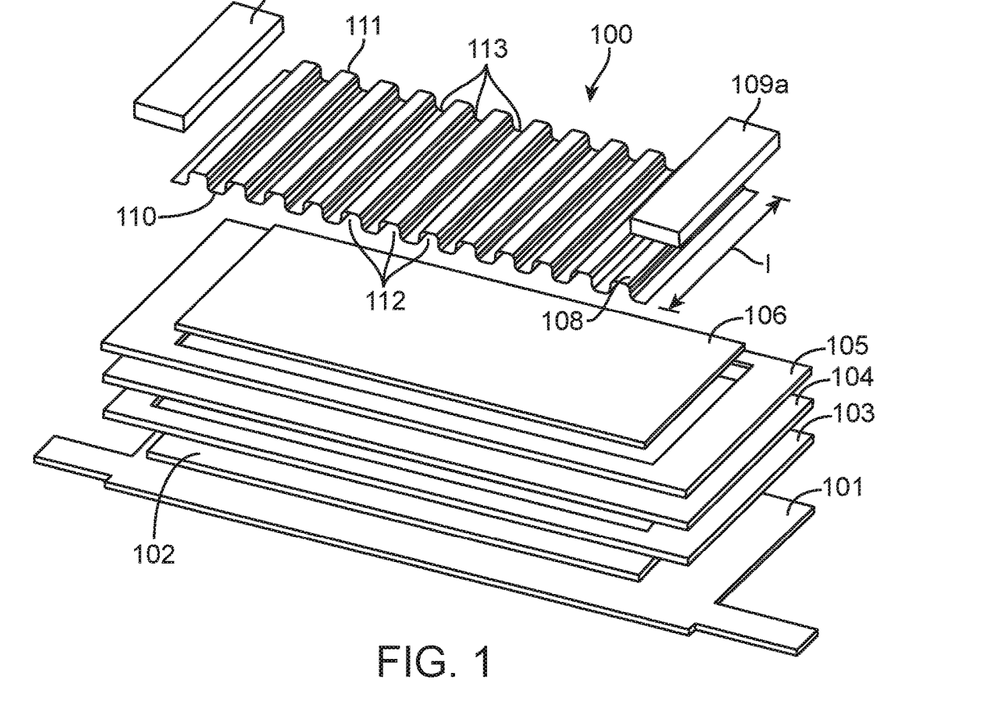
FIG. 1 illustrates aspects of an exploded perspective view of components of a fuel cell assembly.

FIG. 1 shows an exploded perspective view of an illustrative air-cooled fuel cell assembly 100. The fuel cell assembly 100 comprises, in sequential order, an anode plate 101, an anode side diffuser layer 102, an anode gasket 103, a membrane electrode assembly (MEA) 104, a cathode gasket 105, a cathode side diffuser layer 106, a corrugated cathode separator plate 108 and a pair of gaskets 109a, 109b. The corrugated cathode separator plate 108 has a first edge 110 and a second, opposing, edge 111 and defines a series of airflow channels 112, 113, also referred to herein as air supply channels, extending longitudinally between the first and second opposing edges of the separator plate 108. In FIG. 1, the airflow channels 112 and 113 are schematically depicted as straight channels, but other channel profiles can be used in some implementations, as further described herein.

The fuel cell assembly 100 of FIG. 1 may be repeated many times in a layered construction to form a fuel cell stack, for example comprising several tens or even hundreds of cells all contained in a stack between a pair of end plates.

Figure 2:
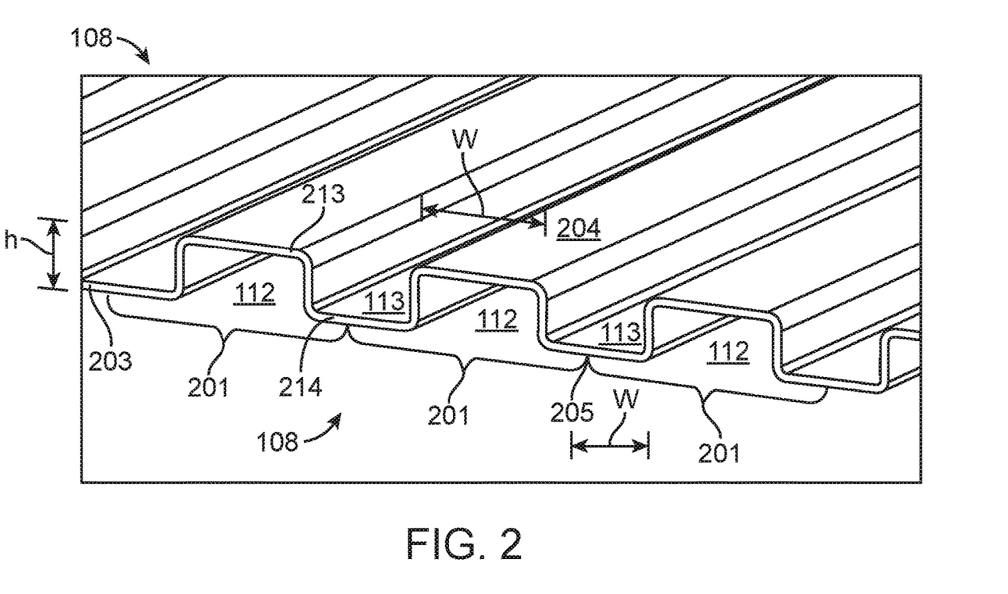
FIG. 2 illustrates aspects of a perspective view of a separator plate in the fuel cell assembly of FIG. 1.

FIG. 2 shows an expanded view of a part of the corrugated cathode separator plate 108. The separator plate has first and second opposing faces 204, 205. The plate 108 has a series of corrugations 201 defining the series of airflow channels 112, 113 extending between the first and second opposing edges 110, 111. Each corrugation 201 in the plate 108 comprises a crest 213 and a trough 214 defining the air flow channels 112, 113. The thickness of the plate 108, i.e. the separation between the plane of all the crests 213 and the plane of all the troughs 214 corresponds to the channel height h. The separation between a pair of adjacent crests 213, or between a pair of adjacent troughs 214, corresponds to the channel width w. The distance between the first and second opposing edges 110, 111 corresponds to the channel length l (seen in FIG. 1).

The function of the corrugated cathode separator plate 108 may be generally described as providing a series of airflow channels 112, 113 each of which has a cross-sectional profile defining an airflow cross-section at any particular longitudinal point along the length l of the channels 112, 113. In the example of FIGS. 1 and 2, the airflow channels 112, 113 are rectangular in cross-section, do not vary in width or depth along their length, and do not vary from channel to channel. In some implementations, cross-sectional profiles other than rectangular may be used, and it is also possible to vary the cross-sectional profiles of the airflow channels 112, 113, along their lengths, or from adjacent channel to channel, or both.

The oxidant air flow channels 112 are 'face downwards' as drawn in FIGS. 1 and 2, i.e. open towards the cathode diffuser 106 and underlying MEA, thereby supplying air as both oxidant and cooling to the active area of the fuel cell. The active area of the fuel cell may be defined as the area of MEA exposed to anode and cathode fluid flows (fuel and oxidant) via the plates 101, 108 and the diffusers 102, 106. In contrast, the coolant airflow channels 113 are 'face upwards' as drawn in FIGS. 1 and 2, and will be closed at the top by being adjacent to the lower surface of an anode plate 101 of an adjacent cell. As such, the coolant airflow channels 113 provide cooling airflow only and do not supply oxidant to the MEA.

An important function of both the oxidant and coolant airflow channels 112, 113 is to enable the flowing air to extract heat from the separator plate. The separator plate is preferably formed from a suitable electrically and thermally conductive material such as stainless steel. Heat generated by the fuel cell in the active area must be extracted from the fuel cell stack to prevent damage to the MEA 104. Straight, uniform cross-section channels 112, 113 such as shown in FIGS. 1 and 2 provide fast airflows, which provide low impedance, low pressure drop, and high throughput of cooling air.

It has been observed that although uniform cross-section, straight channels offer high throughput, they tend towards a near laminar flow condition, resulting in a significant temperature gradient across the channel cross-section. Thermal boundary layers or gradients may form due to the near laminar flow condition through the straight-walled channels, which can inhibit the cooling ability of the airflow. Dividing the channels 112/113 into smaller channels to diminish cross-section size and potentially improve thermal transfer has a disadvantage of creating greater airflow resistance and pressure differential from channel inlets to channel outlets to maintain airflow throughput. This can require higher capacity fans, which can lead to larger parasitic losses in the fuel cell system.

It has been observed that as airflows move along the length l of the channels 112, 113, the temperature of the airflows can rise from absorbed heat from the fuel cell, resulting in a thermal gradient across the active area of the fuel cell. The thermal transfer of heat to the airflows in the channels 112, 113 will therefore become less effective as the temperature of the airflows rises from inlet end (first edge 110) to outlet end (second edge 111). Overheating may then occur in localised hotspots, particularly towards the outlet edge 111 of the separator plate 108. Thermal gradients and overheated areas reduce the power output of the fuel cell stack. The ability to remove more heat from the channels without increasing airflow or channel volumes enables fuel cell stacks to operate at higher current levels without commensurately increasing channel volumes. This improves the current capacity per unit volume of the fuel cells.

In some aspects, the present disclosure provides separator plates having structural features that provide increased heat transfer from the plate 108 to airflow through the channels 112/113.

Figure 3:
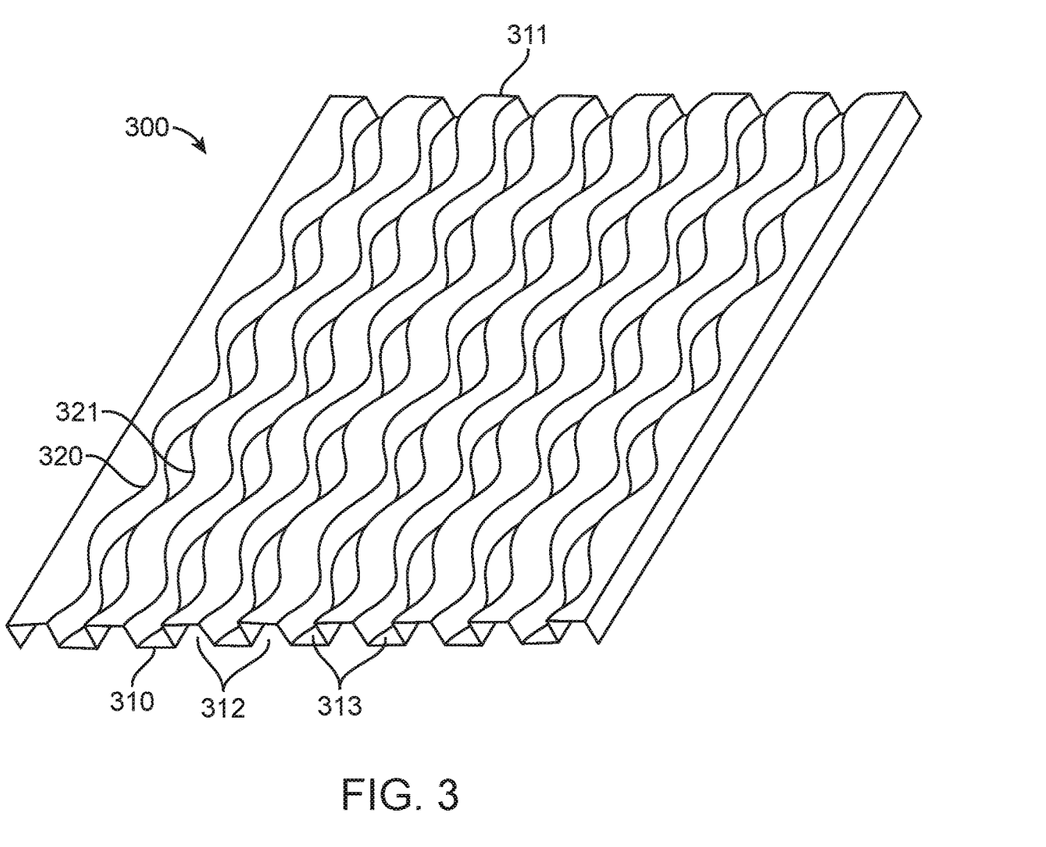
FIG. 3 illustrates aspects of a perspective view of a separator plate of the present disclosure.

FIG. 3 schematically depicts a separator plate 300 having channels 312/313 that functionally correspond to the channels 112/113 described above with regard to FIGS. 1 and 2. Channels 312/313 differ from the straight-walled channels 112/113 as they are formed with structural features and geometries to enhance heat transfer by altering the airflow and to provide enhanced stiffness and compressive load capacity. The plate 300 can be formed with non-linear channels formed from a linked series of bumps 320 opposite to corresponding recesses 321 in the facing channel wall, thereby combining to create a chicane-like structure, which forces at least parts of the channel airflow to deviate from an otherwise straight flow path. The linked series of bumps 320/recesses 321 run the entire longitudinal length l from the inlet end 310 to the outlet end 311. Each bump has a lateral "height" relative to the width w of each channel. These structural features can increase the effectiveness of heat transfer from the plate into the airflow passing along the channels in the plate without changing the width w of the channels. This can be advantageous if changing channel width could affect the localised compression of the underlying diffuser layer 106. In FIG. 3, the flow channels 312 along the edges of the separator plate 300 are shown having straight walls without corresponding bumps 320 and recesses 321. The straight walls can be used in order to match rectangular gaskets as shown in FIG. 1 as gaskets 109a, 109b, but in other implementations, not shown, the outer-most walls of the flow channels 312 along the edges of the separator plates of the disclosure can have corresponding bumps 320 and recesses 321 to match the other channels 312/313 of the separator plate 300, and matching-shaped gaskets, with bumps and recesses, can be used instead of rectangular gaskets 109a, 109b.

Figure 4:
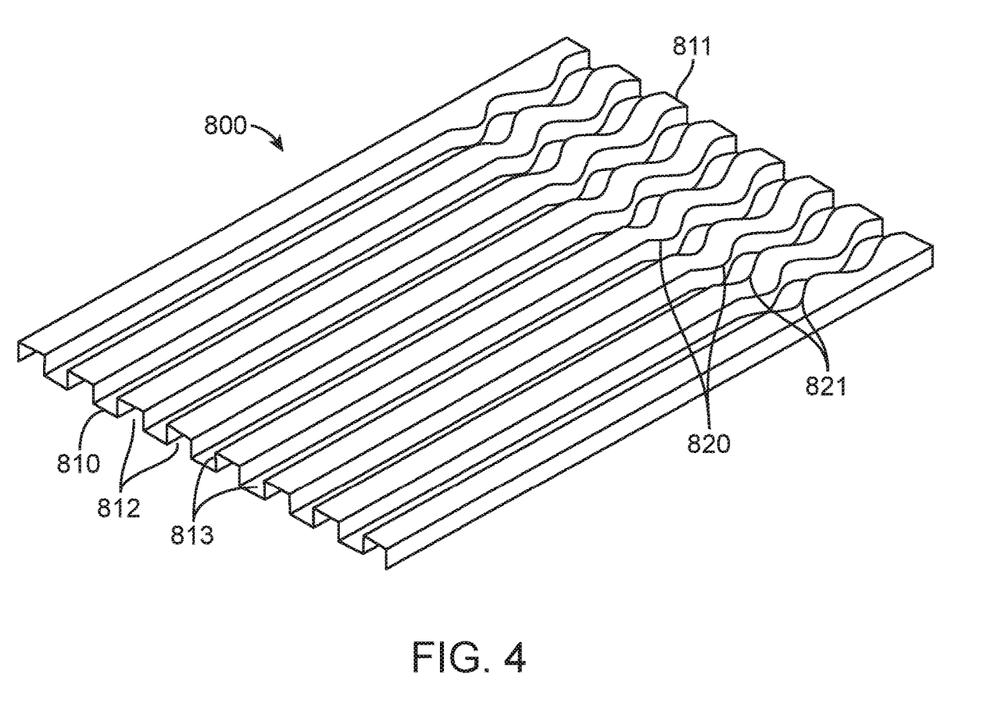
FIG. 4 illustrates aspects of a perspective view of a separator plate of the present disclosure.

Previous work, described more fully in U.S. Patent Pre-Grant Publication No. US2017/0110740A1, incorporated by reference herein in its entirety for al purposes, identified an arrangement of separator plate 800 in which channels 812/813 each included a thermally conductive structure in the form a bump 820, which extended laterally into the channel cross-section of the channels 812/813. As shown in FIG. 4, the bumps 820 were preferably positioned towards the outlet end 81 of the channels 812/813, in the second longitudinal half of the channel length or the final longitudinal third of the channel length, because this region is where heat build-up was observed to increase in a traditional straight-channeled separator plate system. Each bump 820 is opposite to a corresponding recess 821 in the facing channel wall.

It has been discovered through subsequent testing and experimentation that the symmetrical structure in FIG. 3 provides several advantages to the variable structure of FIG. 4. Compressive load testing was performed on separator plates having straight-walled channels, separator plates having channels with linked series of bumps/recesses throughout portions of the longitudinal length l from the inlet end to the outlet end, and separator plates having channels with linked series of bumps/recesses that extend along the entirety of the longitudinal length l from the inlet end to the outlet end. It was observed that plates having channels with a linked series of bumps/recesses that extend along the entirety of the longitudinal length l from the inlet end to the outlet end experienced greater deformation under initial loading than plates having straight-walled channels. Accordingly, a fuel cell stack having a plurality of aligned separator plates with only half or a third of the longitudinal length l having bumps/recesses in a chicane-like structure would experience more deformation under load in that half or third of the stack, leading to lower compression of the associated MEAs in comparison to regions having straight-walled channeling. The resulting uneven compression of MEAs across cells can create shear stresses on the MEAs, which leads to increased risk of cell failure due to pin-holing. Further, it was observed in testing that separator plates having straight-walled channels fail at lower compressive loads compared to separator plates having channels with a linked series of bumps/recesses that extend along the entirety of the longitudinal length l from the inlet end to the outlet end. Accordingly, a separator plate with only half or a third of the longitudinal length l having bumps/recesses in a chicane-like structure cannot withstand the same degree of compression for a given material thickness as a separator plate having channels with a linked series of bumps/recesses that extend along the entirety of the longitudinal length l from the inlet end to the outlet end. Because the compression of the stack is set to the level necessary to compress the MEA sufficiently for electrical conduction purposes, and therefore less material is necessary to form a separator plate having channels with a linked series of bumps/recesses that extend along the entirety of the longitudinal length l from the inlet end to the outlet end. Accordingly, gravimetric power density for the fuel cell stack can be improved. Further, manufacturing and formation of separator plates is improved by incorporating the liked series of bumps/recesses that extend throughout the entirety of the longitudinal length l. Forming portions of channels with bumps/recesses requires a different amount of material to be drawn through the tool than is needed for formation of straight-walled channels. As a result, in order to form a uniform thickness plate, a trapezoidal material must be used to form a separator plate that has regions of both straight-walled and bumped/recessed walls. Preferred manufacturing processes utilize rectangular sheet metal stock, such as 0.1 mm steel plate, which can be warped by an uneven drawing of material by straight-walled and bumped/recessed walls, resulting in an unusable separator plate in a fuel cell stack that requires precise parallel alignments. It is also expected that regions of increased stress would be introduced at the transition region between straight and wavy channels. Finally, a separator plate having channels with a linked series of bumps/recesses that extend along the entirety of the longitudinal length l from the inlet end to the outlet end can be formed as a symmetrical part, such that during assembly no indexing of inlet/outlet ends is necessary to ensure proper alignment of components throughout a fuel cell stack. This is advantageous to simplify assembly and reduce costs.

Figure 5A:
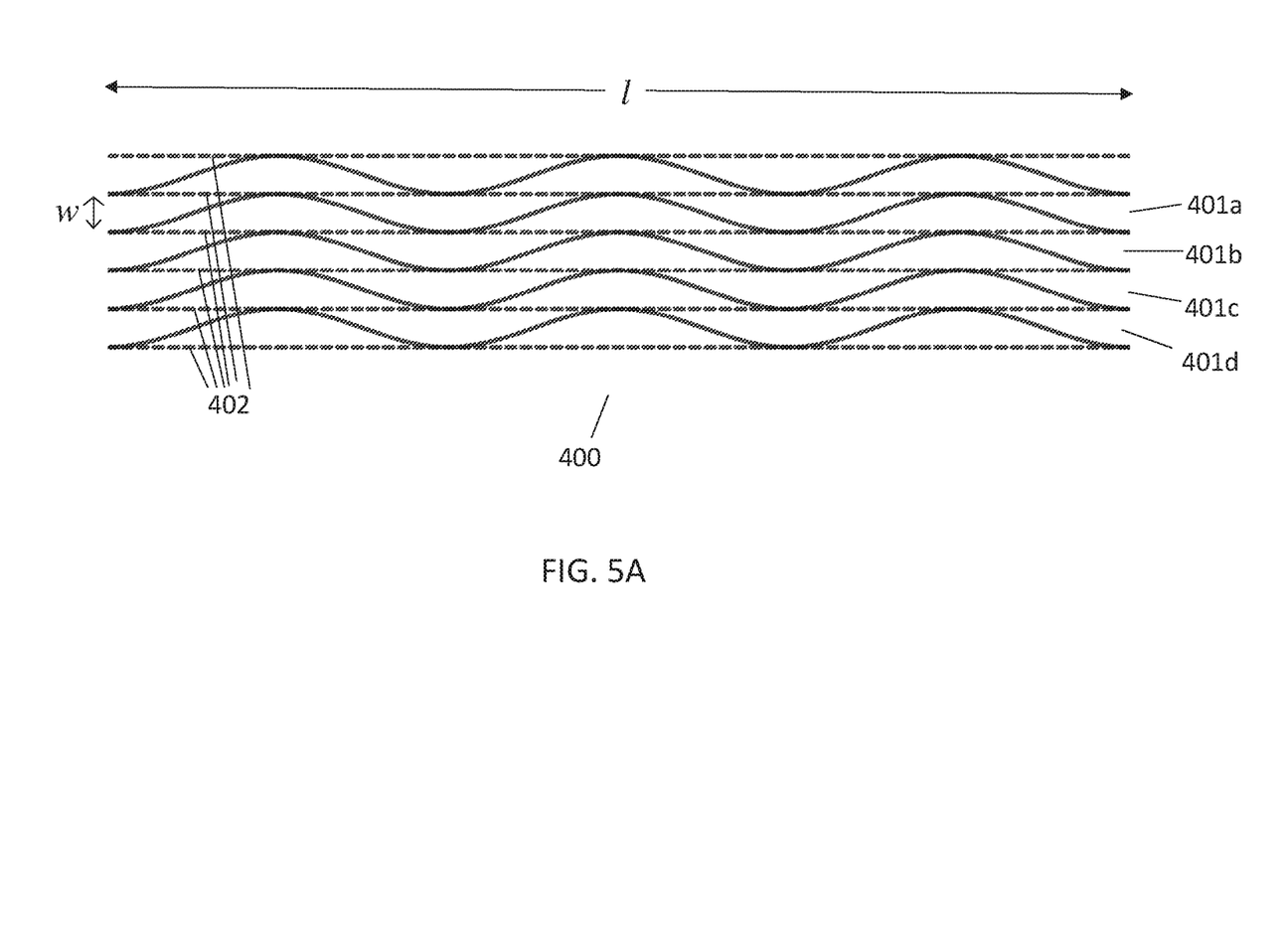
FIGS. 5A-5B illustrate schematic top views of aspects of separator plates of the present disclosure.
Figure 5B:
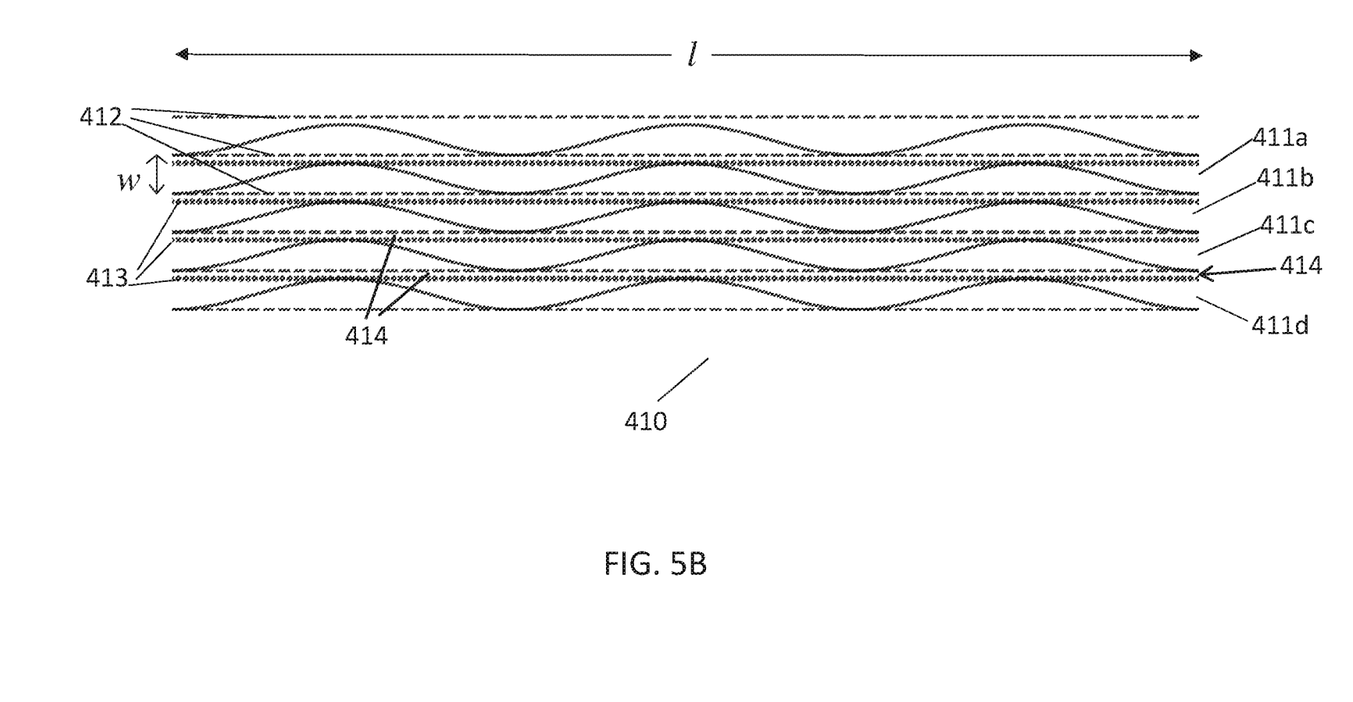

Exemplary geometries for linked series of bumps/recesses are shown in FIGS. 5A-5B. In some implementations, the linked series of bumps/recesses can be made as a sinusoidal wave having an amplitude and a frequency. In some implementations, the amplitude can be about 0.2, about 0.3, about 0.4, about 0.5, about 0.6, about 0.7, about 0.8, about 0.9, about 1.0, about 1.1, about 1.2, about 1.3, about 1.4, or about 1.5 times the width w of the channel. In certain implementations, the frequency can be selected such that there are about 1, about 2, about 2.5, about 3, about 3.5, about 4, about 4.5, about 5, about 5.5, about 6, about 6.5, about 7, about 7.5, or about 8 complete cycles of the sinusoidal wave for the longitudinal length l of the separator plates. It has been observed that in some preferred implementations, the frequency is selected such that the tangents to the sinusoidal wave patterns are perpendicular to the inlet end (analogous to the first edge 110 shown in FIG. 1) and the outlet end (analogous to the second edge 111 shown in FIG. 1), such that the air flow entering and leaving the stack may do so directly perpendicular to the inlet and outlet faces of the fuel cell stack. It has been observed that arranging the sinusoidal wave patterning such that the tangents to the sinusoidal waves are at an angle offset from perpendicular to the inlet end or outlet end can increase the pressure drop across the separator plate with no gain in heat transfer capacity. In certain implementations the offset angle from perpendicular to the inlet end or outlet end of the tangents to the sinusoidal waves of the flow channels is about 0 degrees, less than about 1 degrees, less than about 2 degrees, less than about 3 degrees, less than about 4 degrees, less than about 5 degrees, less than about 10 degrees, or less than about 15 degrees. In certain implementations, the frequency can be selected such that the wavelength of the sinusoidal wave is about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.33, about 8.5, about 9.0, about 9.5, about 10.0, about 10.5, about 11.0, about 11.5, about 12.0, about 15.0, about 20, or about 25.0 times the width w of the channel.

FIG. 5A shows aspects of flow channels of an implementation of a separator plate 400 of the disclosure. A top-view schematic shows four adjacent flow channels 401a, 401b, 401c, 401d having linked series of bumps/recesses made in sinusoidal wave patterns. Flow channels 401a and 401c have the same orientation into or out of the plane of the figure, while flow channels 401b and 401d would have the same orientation but opposite to that of 401a and 401c. Accordingly, flow channels 401a and 401c may be analogous to channels 312 while flow channels 401b and 401d are analogous to channels 313, or vice versa. The implementation of FIG. 5A incorporates sinusoidal waves having an amplitude equal to the width w of the channels. Dashed lines are shown to represent the position of walls 402 of an analogous straight-walled channels of the same width w. The flow channels 401a, 401b, 401c, 401d shown in FIG. 5A have 3 complete cycles of the sinusoidal wave for the longitudinal length l of the separator plate, but in other implementations, more or less cycles can be provided.

In some implementations, such as that shown in FIG. 5A, the amplitude is at least about 1.0 times the width w of the channel. It has been observed that heat transfer was improved by eliminating any straight-through airflow paths by having the amplitude of the sinusoidal wave of linked series of bumps/recesses be at least as large as the width w. Without being bound by any particular theory, it is believed that any straight-through airflow path allows for certain portions of the airflow to pass through the separator plate too rapidly for optimum heat transfer.

FIG. 5B shows aspects of flow channels of an implementation of a separator plate 410 of the disclosure. A top-view schematic shows four adjacent flow channels 411a, 411b, 411c, 411d having linked series of bumps/recesses made in sinusoidal wave patterns. Flow channels 411a and 411c have the same orientation into or out of the plane of the figure, while flow channels 411b and 411d would have the same orientation but opposite to that of 411a and 411c. Accordingly, flow channels 411a and 411c may be analogous to channels 312 while flow channels 411b and 411d are analogous to channels 313, or vice versa. The implementation shown incorporates sinusoidal waves having an amplitude less than the width w of the channels. Dashed lines are shown to represent the position of walls 412 of an analogous straight-walled channels of the same width w. The flow channels 411a, 411b, 411c, 401d shown in FIG. 5B have 3 complete cycles of the sinusoidal wave for the longitudinal length l of the separator plate, but in other implementations, more or less cycles can be provided. Because the amplitude less than the width w of the channels, straight-through airflow paths 414 are present in the channels of the separator plate, indicated with dotted lines 413 which define the first edges of the straight-through airflow paths 412 while the dashed lines 412 define the second edges of the straight-through airflow paths 412.

In some implementations, the frequency is selected to provide for between about 3 and about 6 complete cycles of the sinusoidal wave for the longitudinal length l. In some preferred implementations, the frequency is selected to provide for about 3 complete cycles of the sinusoidal wave for the longitudinal length l.

It has been observed in testing and experimentation that a balance must be struck between slowing the airflow to improve heat transfer and the resulting parasitic losses due to increased pressure differential from the inlet end to the outlet end. In some implementations, the wavelength of a sinusoidal wave of linked series of bumps/recesses can be about 3, about 4, about 5, about 6, about 7, about 8, about 9, about 10, about 11, about 12, about 13, or about 14 times the width w of the channel. In certain implementations, the wavelength can be between about 6 and about 10 times the width w. In some preferred implementations, the wavelength is about 8 times the width w.

In some implementations, the surfaces of the channel walls can be provided with additional texturing or structural features to further inhibit laminar flow boundary layers near the wall surfaces. In certain implementations, the surfaces of the channel walls can be provided with a surface roughness. In other implementations, the surfaces of the channel walls can be provided with bumps or protrusions, either formed integrally in the separator plate material or formed via an overmolding or coating process. The bumps or protrusions can have a nominal feature size that is smaller than the channel height h or a fraction thereof.

The separator plates illustrated herein each exemplify a cathode separator plate combining both oxidant air supply channels 112 and cooling air supply channels 113. The separator plates as described herein could alternatively be configured as a separator plate providing only combined cathode oxidant and cooling air to channels that are fluidly coupled to the MEA, or as a separator plate providing only cooling air isolated from the MEA.

The present disclosure provides methods of operating a fuel cell stack, the methods comprising providing a fuel cell stack having a plurality of air-cooled fuel cells with air flow to an inlet face. Each air-cooled fuel cell, as shown schematically in FIG. 1 can have a fuel cell separator plate with oxidant air supply and cooling air supply channels therein. The methods can comprise providing air flow into at least one separator plate having flow channels each comprising a linked series of bumps opposite to corresponding recesses in adjacent flow channels, the linked series of bumps and recesses being formed in a sinusoidal wave pattern along the entirety of the longitudinal length l from the inlet face to the opposing outlet face of the fuel cell stack. In some implementations, the methods can comprise providing air flow into the at least one separator plate, wherein the at least one separator plate has flow channels having an amplitude equal to or greater than a width w of the flow channels, and a frequency such that there are between about 3 and about 6 complete cycles of the sinusoidal wave for the longitudinal length l of the at least one separator plate. In certain implementations, the amplitude is equal to the width w of the flow channels. In further implementations, the frequency is such that there are about 3 complete cycles of the sinusoidal wave for the longitudinal length l of the at least one separator plate.

EXAMPLE 1

Figure 6:
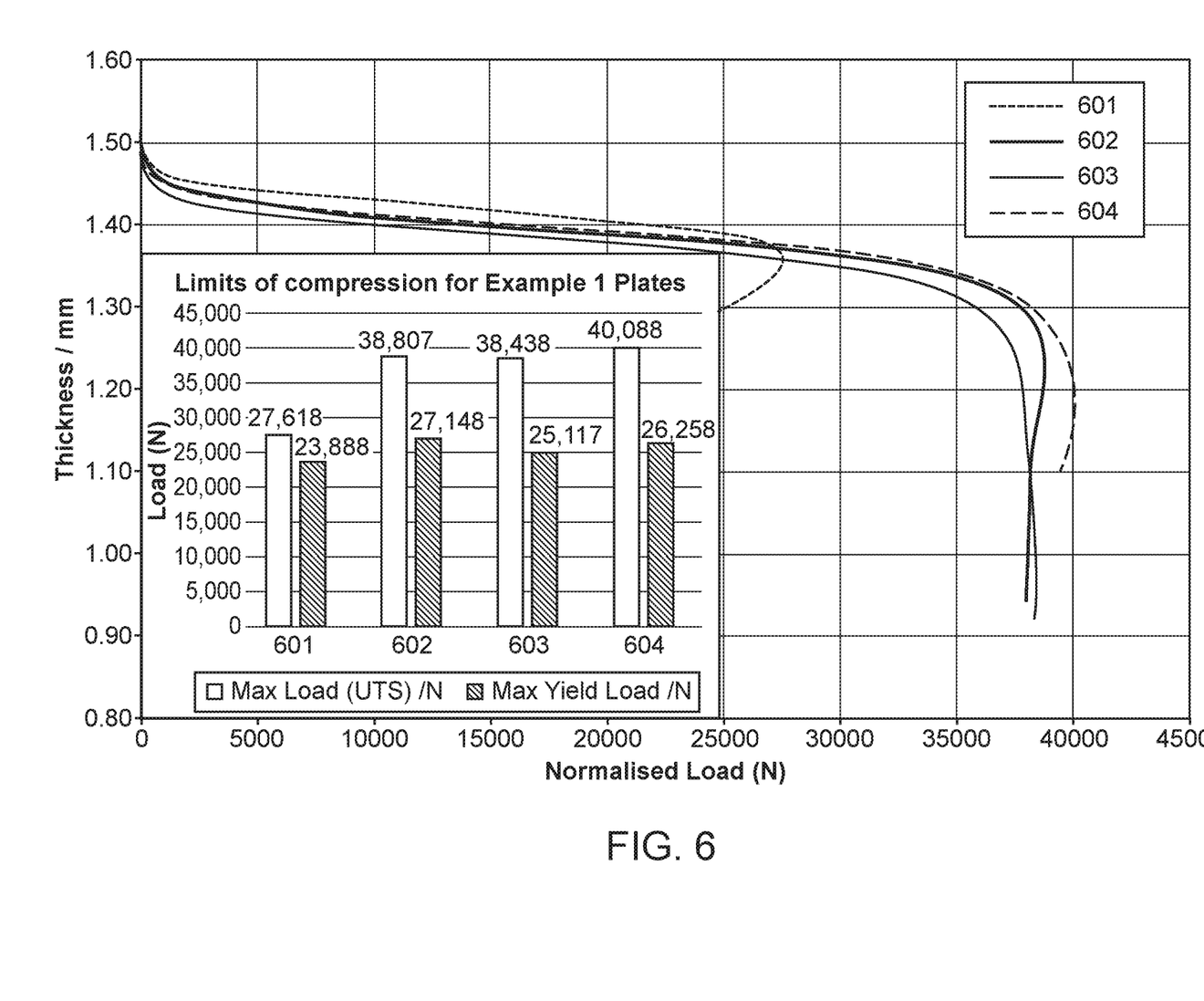
FIG. 6 shows data from compression testing of separator plates of the present disclosure.
Figure 7:
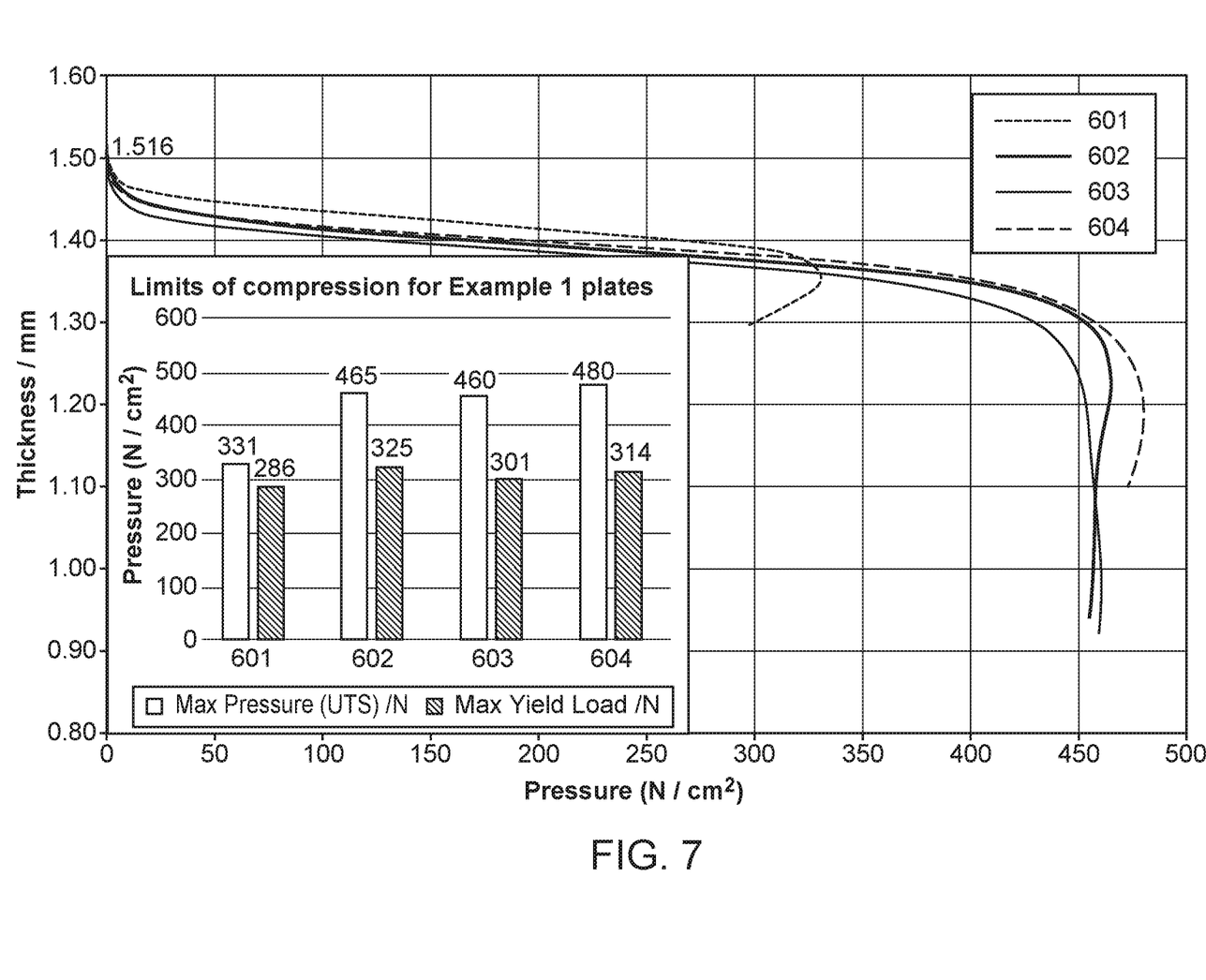
FIG. 7 shows data from compression testing of separator plates of the present disclosure.
Figure 8:
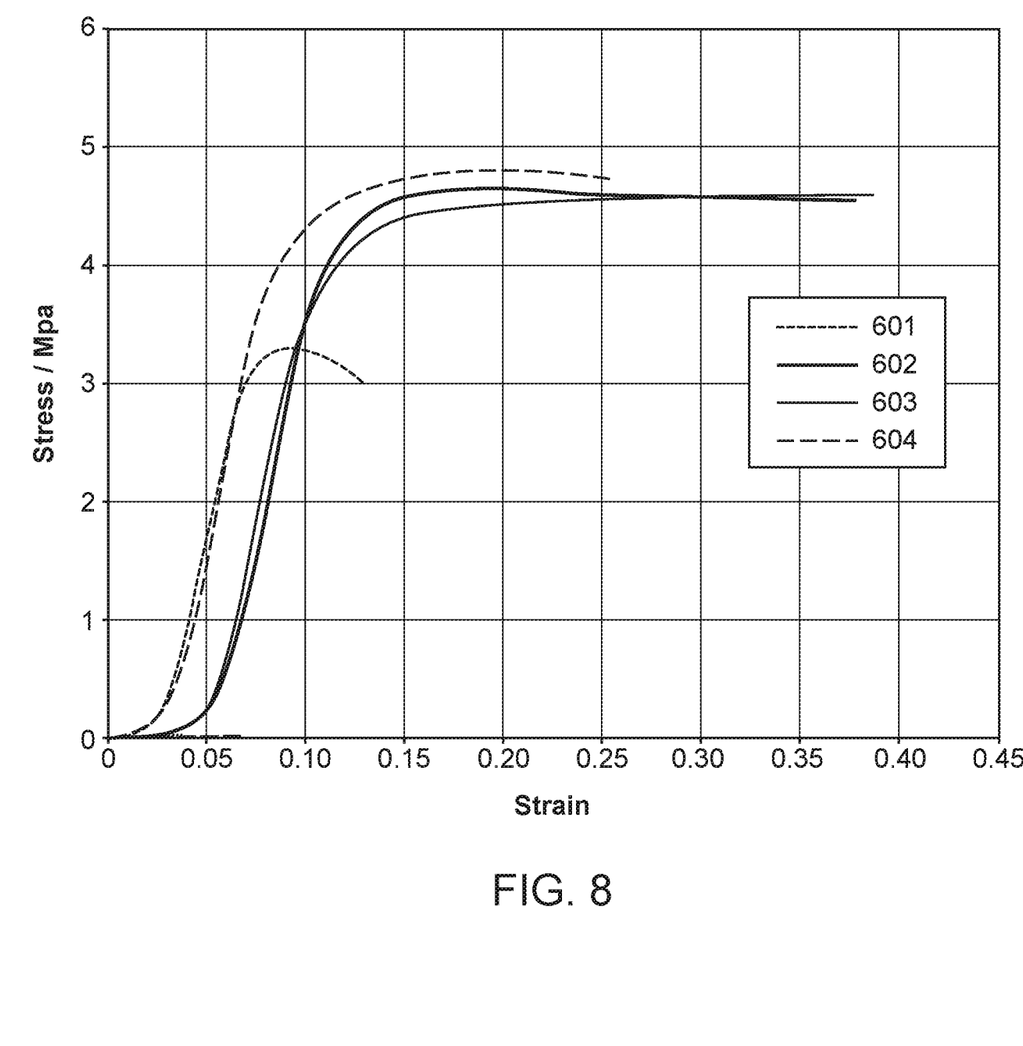
FIG. 8 shows data from stiffness testing of separator plates of the present disclosure.

Fuel cell separator plates of the present disclosure were tested under compression and for stiffness. Each separator plate had identical overall dimensions including a length l of 50.0 mm and an orthogonal dimension of about 12.8 cm for an overall are of about 64 cm$^2$, and 64 flow channels having identical width w equal to 2.0 mm. A first separator plate 601 had straight, uniform cross-section channels, such as shown in FIGS. 1 and 2. Other separator plates 602, 603, 604 had flow channels having linked series of bumps/recesses made in sinusoidal wave patterns. Separator plates 602 and 603 were formed with sinusoidal wave patterns having sinusoidal waves having an amplitude equal to the width w of the channels and a frequency selected such that there are 3.0 complete cycles of the sinusoidal wave for the longitudinal length l of the separator plates. Separator plate 604 was formed with sinusoidal wave patterns having sinusoidal waves having an amplitude equal to 0.5 times the width w of the channels and a frequency selected such that there are 5.0 complete cycles of the sinusoidal wave for the longitudinal length l of the separator plates. Separator plate 604 therefore had straight-through airflow paths as the amplitude of the sinusoidal wave patterning was less than the width w of the channels. Compressive testing was performed on separator plates 601, 602, 603, and 604, with results shown in FIGS. 6 and 7, which shows that the separator plates 602, 603, and 604 having sinusoidal wave patterned flow channels have significantly higher failure load in comparison to the straight, uniform cross-section channeled separator plate 601. Stiffness testing was performed on separator plates 601, 602, 603, and 604, with results shown in FIG. 8, which shows that separator plates 601 and 604 have higher stiffness at lower compressive force as compared to separator plates 602 and 603. Separator plates 601, 602, 603, and 604 were also tested for heat transfer ability, data not shown herein, with separator plates 602 and 603 demonstrating significantly better heat transfer in comparison with both the straight-walled separator plate 601 and the separator plate 604 having some straight-through airflow paths.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

The invention claimed is:
1. A fuel cell separator plate comprising:
a corrugated cathode separator plate having a series of evenly separated troughs and crests configured as airflow channels wherein a crest on a first side is a trough on the opposing side;
a first edge;
a second, opposing, edge;
wherein a channel length l corresponds to the distance between the first and second opposing edges;
wherein a linked series of bumps and recesses run the entire channel length l and the linked series of bumps and recesses in both sides of the separator plate are formed as a sinusoidal wave having an amplitude of at least 1 times the width "w" of the channel;
wherein the sinusoidal wave running the entire channel length l from edge-to-edge of the corrugated plate transfers more heat to an airflow than a corrugated separator plate with straight channels; and,
wherein the corrugated cathode separator plate with a sinusoidal wave running the entire channel length l from edge having a frequency of 3.0 complete cycles over the length l has a maximum load before failure at least 20% higher when compared to a maximum load before failure of a corrugated separator plate with straight channels; and,
wherein said frequency and width are configured to prohibit straight-through airflow paths which are counter to optimum heat transfer.

* * * * *